United States Patent
Dalmatov (10) Patent No.: US 11,068,406 B2
(45) Date of Patent: Jul. 20, 2021

(54) MAINTAINING A SINGLE COPY OF DATA WITHIN A READ CACHE

(71) Applicant: EMC IP Holding Company LLC, Hopkinton, MA (US)

(72) Inventor: Nickolay Alexandrovich Dalmatov, Saint Petersburg (RU)

(73) Assignee: EMC IP Holding Company LLC, Hopkinton, MA (US)

(*) Notice: Subject to any disclaimer, the term of this patent is extended or adjusted under 35 U.S.C. 154(b) by 618 days.

(21) Appl. No.: 16/066,498

(22) PCT Filed: Jul. 27, 2017

(86) PCT No.: PCT/RU2017/000557
§ 371 (c)(1),
(2) Date: Jun. 27, 2018

(87) PCT Pub. No.: WO2019/022632
PCT Pub. Date: Jan. 31, 2019

(65) Prior Publication Data
US 2021/0173788 A1    Jun. 10, 2021

(51) Int. Cl.
*G06F 12/0891* (2016.01)
(52) U.S. Cl.
CPC .. *G06F 12/0891* (2013.01); *G06F 2212/1044* (2013.01)
(58) Field of Classification Search
CPC .............. G06F 12/0891; G06F 2212/1044
See application file for complete search history.

(56) References Cited

U.S. PATENT DOCUMENTS

| | | |
|---|---|---|
| 7,640,262 B1 | 12/2009 | Beaverson et al. |
| 7,673,099 B1 | 3/2010 | Beaverson et al. |
| 7,720,892 B1 | 5/2010 | Healey, Jr. et al. |
| 7,930,559 B1 | 4/2011 | Beaverson et al. |
| 8,538,933 B1 | 9/2013 | Hu et al. |
| 8,935,446 B1 | 1/2015 | Shilane et al. |
| 9,158,468 B2 | 10/2015 | Baldwin et al. |
| 9,189,402 B1 | 11/2015 | Smaldone et al. |
| 9,189,414 B1 | 11/2015 | Shim et al. |
| 9,304,914 B1 | 4/2016 | Douglis et al. |
| 9,336,143 B1 | 5/2016 | Wallace et al. |
| 9,390,116 B1 | 7/2016 | Li et al. |
| 9,430,156 B1 | 8/2016 | Shilane et al. |
| 9,442,941 B1 | 9/2016 | Luz et al. |

(Continued)

*Primary Examiner* — Sean D Rossiter
(74) *Attorney, Agent, or Firm* — BainwoodHuang (57) ABSTRACT

A technique processes read requests from a set of requesters. The technique involves providing, while a first data element and a second data element are stored in secondary storage, the first data element from the secondary storage to the set of requesters in response to a first request to read the first data element from the set of requesters. The technique further involves providing, after the first data element is provided to the set of requesters in response to the first request, the second data element to the set of requesters in response to a second request to read the second data element from the set of requesters. The technique further involves maintaining, in response to detecting that the first data element and the second data element match, a single copy of the first and second data elements in a read cache for subsequent read access.

18 Claims, 6 Drawing Sheets

(56) References Cited

U.S. PATENT DOCUMENTS

| | | |
|---|---|---|
| 9,449,011 B1 | 9/2016 | Chen et al. |
| 9,460,025 B1 | 10/2016 | Wallace et al. |
| 9,501,369 B1 | 11/2016 | Pandey et al. |
| 9,529,731 B1 | 12/2016 | Wallace et al. |
| 9,569,367 B1 | 2/2017 | Wigmore et al. |
| 9,678,688 B2 | 6/2017 | Bates |
| 9,804,966 B1 * | 10/2017 | Sadanandan ........ G06F 12/0862 |
| 9,880,746 B1 | 1/2018 | Shilane et al. |
| 9,996,426 B1 | 6/2018 | Pogde et al. |
| 10,001,927 B1 | 6/2018 | Trachtman et al. |
| 10,055,420 B1 | 8/2018 | Podge et al. |
| 10,078,598 B1 | 9/2018 | Wallace et al. |
| 2012/0023107 A1 | 1/2012 | Nachnani et al. |
| 2018/0081591 A1 * | 3/2018 | Maheshwari ......... G06F 3/0685 |
| 2018/0217777 A1 * | 8/2018 | Jiang .................. G06F 13/4282 |
| 2019/0227941 A1 * | 7/2019 | Chang .................. G06F 3/0611 |
| 2021/0034538 A1 * | 2/2021 | Meiri .................. G06F 12/0824 |

\* cited by examiner

MAINTAINING A SINGLE COPY OF DATA WITHIN A READ CACHE

BACKGROUND

Data storage systems process input/output (I/O) requests on behalf of host computers. Along these lines, data storage systems write data to storage drives in response to write requests from the host computers. Similarly, data storage systems read data from the storage drives in response to read requests from the host computers.

One conventional data storage system includes a read cache that temporarily buffers data that is read from storage drives in response to read requests. For example, suppose that the conventional data storage system receives a first read request from a host computer to read certain data of a file that is stored by the storage drives. When the conventional data storage system retrieves that data from the storage drives to satisfy the first read request, the conventional data storage system buffers that data in the read cache. Accordingly, if the conventional data storage system receives a second read request from the host computer to read that same data of the file while the data still resides within the read cache, the conventional data storage system provides that data from the read cache rather than re-reading that data from the storage drives thus reducing latency when delivering the data in response to the second read request.

SUMMARY

Although space within the read cache space may be limited and thus relatively expensive, it is possible for the conventional data storage system to buffer multiple copies of the same data within the read cache for an extended period of time. Along these lines, suppose that the conventional data storage system receives a first read request to read first data of a first file, and responds to the first read request by copying the first data from storage drives into the read cache. Then, suppose that the conventional data storage system receives a second read request to read second data of a second file, and responds to the second read request by copying the second data from the storage drives into the read cache. Here, it is possible that the first data and the second data are the same even if the data originated from different files and, if so, multiple copies of the same data now reside within the read cache. Unfortunately, such inefficient use of the read cache may cause other data within the read cache to be displaced. As a result, the displaced data must now be re-read from the storage drives thus imposing greater latency when delivering that data.

In contrast to the above-described conventional data storage system in which it is possible to hold the same data in multiple locations of a read cache for an extended period of time, improved techniques are directed to maintaining a single copy of data within a read cache. To this end, aspects of deduplication may be employed. In some arrangements, deduplication is performed on data within the read cache to detect and remove copies of the same data. In other arrangements, potential matches are detected while retrieving data from secondary storage into the read cache so that placing multiple copies of the same data within the read cache can be avoided altogether. Such operation makes more efficient use of the read cache, e.g., more data can now be stored within the read cache, unnecessary displacement of data is avoided, etc.

One embodiment is directed to a method of processing read requests from a set of requesters. The method includes, while a first data element and a second data element are stored in secondary storage, providing the first data element from the secondary storage to the set of requesters in response to a first request to read the first data element. The first request is received by the data storage circuitry from the set of requesters. The method further includes, after the first data element is provided to the set of requesters in response to the first request, providing the second data element to the set of requesters in response to a second request to read the second data element. The second request being received by the data storage circuitry from the set of requesters. The method further includes, in response to detecting that the first data element and the second data element match, maintaining a single copy of the first and second data elements in a read cache for subsequent read access by the set of requesters.

In some arrangements, providing the first data element to the set of requesters in response to the first request includes placing a copy of the first data element in the read cache. In these arrangements, providing the second data element to the set of requesters in response to the second request includes placing a copy of the second data element in the read cache. Furthermore, maintaining the single copy of the first and second data elements in the read cache for subsequent read access includes performing a deduplication operation that deduplicates the copy of the first data element and the copy of the second data element into the single copy of the first and second data elements.

In some arrangements, the read cache includes a deduplication index of digest entries. Each digest entry includes a digest that identifies a particular data element in the read cache. In these arrangements, performing the deduplication operation includes, based on accessing the deduplication index of the read cache, detecting a match between (i) a first digest of a first digest entry of the deduplication index that identifies the first data element and (ii) a second digest of a second digest entry of the deduplication index that identifies the second data element.

In some arrangements, performing the deduplication operation further includes, in response to detecting the match between the first digest and the second digest, performing a bit-by-bit comparison operation that compares each bit of the first data element with a corresponding bit of the second data element. Such operation reliably determines whether the first data element and the second data element match each other.

In some arrangements, performing the deduplication operation further includes, in response to detecting the match between the first digest and the second digest, deleting one of the first data element and the second data element from the read cache.

In some arrangements, performing the deduplication operation further includes deleting one of the first data element and the second data element from the read cache in response to a result of the bit-by-bit comparison operation indicating that the first data element and the second data element match each other. That is, after the digests indicate a possible match, the data is compared to confirm that the data is identical before either the first data element or the second data element is removed from the read cache.

In some arrangements, providing the first data element to the set of requesters in response to the first request further includes providing a first pointer that leads to (i) the first digest entry of the deduplication index and (ii) the copy of the first data element placed in the read cache. In these arrangements, providing the second data element to the set of requesters in response to the second request further includes providing a second pointer that leads to (i) the second digest entry of the deduplication index and (ii) the copy of the second data element placed in the read cache. Additionally, performing the deduplication operation further includes, in response to detecting the match between the first digest and the second digest, replacing the second pointer with the first pointer and nullifying the second digest entry of the deduplication index.

In some arrangements, the method further includes, after the deduplication operation is performed, providing the first data element from the read cache to the set of requesters in response to another request to read the second data element from the set of requesters.

In some arrangements, the method further includes, after the deduplication operation is performed, providing the first data element from the read cache to the set of requesters in response to another request to read the first data element from the set of requesters.

In some arrangements, providing the first data element to the set of requesters in response to the first request includes placing a copy of the first data element in the read cache. In these arrangements, providing the second data element to the set of requesters in response to the second request includes (i) detecting that the first data element and the second data element match each other and (ii) providing the first data element from the read cache to the set of requesters in response to the second request to read the second data element.

In some arrangements, the data storage circuitry includes a deduplication index of digest entries. Each digest entry includes a digest that uniquely identifies a particular data element stored in the secondary storage. In these arrangements, detecting that the first data element and the second data element match each other includes detecting a match between (i) a first digest of a first digest entry of the deduplication index that identifies the first data element and (ii) a second digest of a second digest entry of the deduplication index that identifies the second data element.

In some arrangements, the method further includes, in response to detecting that the first data element and the second data element match each other, updating a set of pointers that initially referenced the second data element to subsequently reference the first data element in the read cache.

In some arrangements, the method further includes, prior to receiving the first request to read the first data element, generating the first digest based on the first data element and adding the first digest to the first digest entry of the deduplication index. Additionally, the method includes, prior to receiving the second request to read the second data element, generating the second digest based on the second data element and adding the second digest to the second digest entry of the deduplication index.

In some arrangements, the set of requesters includes a host computer which is external to the data storage circuitry. In these arrangements, the method further includes, while providing the first data element, providing the second data element, and maintaining the single copy of the first and second data elements in the read cache, contemporaneously performing additional input/output (I/O) operations that store data elements within the secondary storage and load data elements from the secondary storage on behalf of the host computer.

In some arrangements, contemporaneously performing the additional I/O operations includes, prior to providing the first data element from the secondary storage to the set of requesters in response to the first request to read the first data element, placing a third data element in the read cache, the first data element overwriting the third data element in the read cache when the first data element is provided from the secondary storage to the set of requesters.

In some arrangements, the method further includes, after the third data element is overwritten in the read cache by the first data element, overwriting the first data element in the read cache with a fourth data element in response to another read request from the set of requesters.

Another embodiment is directed to data storage equipment which includes a read cache, a storage device interface that interfaces with a set of storage devices that provides secondary storage, and control circuitry coupled with the read cache and the storage device interface. The control circuitry is operative to:

(A) while a first data element and a second data element are stored in the secondary storage, provide the first data element from the secondary storage to a set of requesters in response to a first request to read the first data element, the first request being received by the control circuitry from the set of requesters;

(B) after the first data element is provided to the set of requesters in response to the first request, providing the second data element to the set of requesters in response to a second request to read the second data element, the second request being received by the control circuitry from the set of requesters; and (C) in response to detecting that the first data element and the second data element match, maintaining a single copy of the first and second data elements in the read cache for subsequent read access by the set of requesters.

Yet another embodiment is directed to a computer program product having a non-transitory computer readable medium which stores a set of instructions to process read requests from a set of requesters. The set of instructions, when carried out by computerized circuitry, causes the computerized circuitry to perform a method of:

(A) while a first data element and a second data element are stored in secondary storage, providing the first data element from the secondary storage to the set of requesters in response to a first request to read the first data element, the first request being received by the computerized circuitry from the set of requesters;

(B) after the first data element is provided to the set of requesters in response to the first request, providing the second data element to the set of requesters in response to a second request to read the second data element, the second request being received by the computerized circuitry from the set of requesters; and (C) in response to detecting that the first data element and the second data element match, maintaining a single copy of the first and second data elements in a read cache for subsequent read access by the set of requesters.

It should be understood that, in the cloud context, at least some of electronic circuitry is formed by remote computer resources distributed over a network. Such an electronic environment is capable of providing certain advantages such as high availability and data protection, transparent operation and enhanced security, big data analysis, etc.

Other embodiments are directed to electronic systems and apparatus, processing circuits, computer program products, and so on. Some embodiments are directed to various methods, electronic components and circuitry which are involved in maintaining a single copy of data elements within a read cache.

BRIEF DESCRIPTION OF THE DRAWINGS

The foregoing and other objects, features and advantages will be apparent from the following description of particular embodiments of the present disclosure, as illustrated in the accompanying drawings in which like reference characters refer to the same parts throughout the different views. The drawings are not necessarily to scale, emphasis instead being placed upon illustrating the principles of various embodiments of the present disclosure.

DETAILED DESCRIPTION

An improved technique is directed to maintaining a single copy of a data element within a read cache. To this end, aspects of deduplication may be employed. In some arrangements, deduplication is performed on data within the read cache to detect and remove copies of the same data. In other arrangements, potential matches are detected while retrieving data from secondary storage into the read cache so that placing multiple copies of the same data within the read cache can be avoided altogether. As a result, more data can now be stored within the read cache, unnecessary displacement of data may be avoided, and so on.

Figure 1:
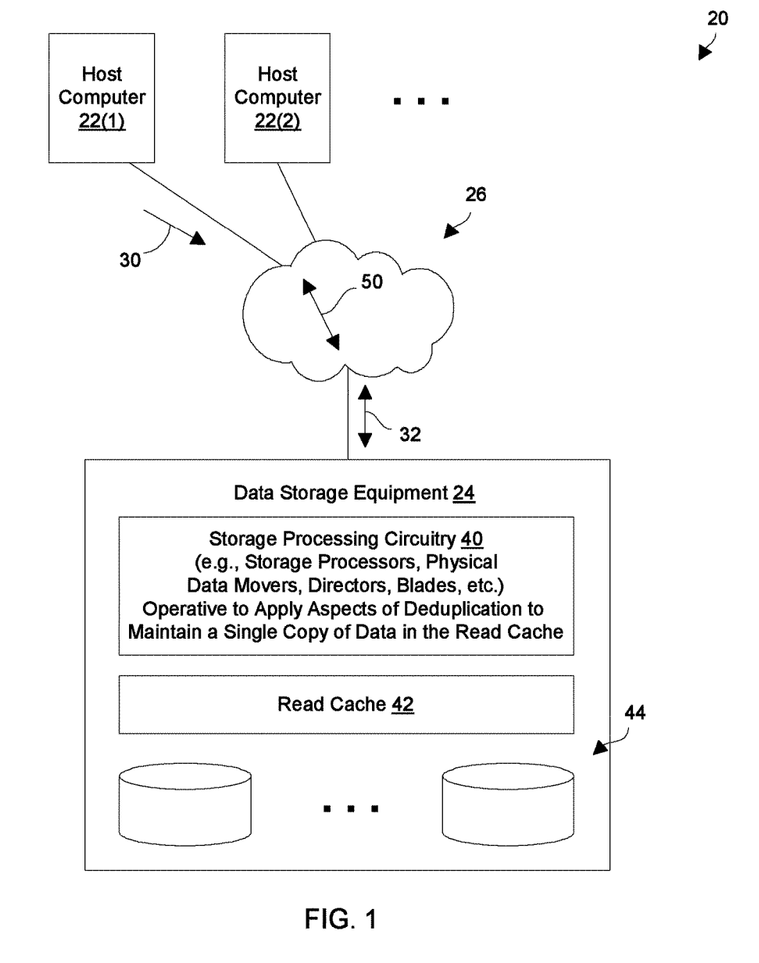
FIG. 1 is a block diagram of a data storage environment which utilizes aspects of deduplication to maintain a single copy of a data element within a read cache.

FIG. 1 is a block diagram of a data storage environment 20 which utilizes aspects of deduplication to maintain single copies of data elements within a read cache. The data storage environment 20 includes host computers 22(1), 22(2), . . . (collectively, host computers 22), data storage equipment 24, and a communications medium 26. The data storage environment 20 may include other components as well such as replication sites, user devices, and so on.

Each host computer 22 is constructed and arranged to perform useful work. For example, a host computer 22 may operate as a web server, a file server, an email server, a transaction server, an enterprise server, combinations thereof, and so on, which provides I/O requests 30 (e.g., small computer system interface or SCSI commands) to the data storage equipment 24. Such I/O requests 30 direct the data storage equipment 24 to store and retrieve host data 32 on behalf of the host computers 22.

The data storage equipment 24 includes storage processing circuitry 40, a read cache 42, and an array of storage devices 44 (e.g., solid state storage devices, magnetic disk drives, tiered storage, etc.). The storage processing circuitry 40 may include one or more physical storage processors or engines, data movers, director boards, blades, I/O modules, storage drive controllers, switches, other hardware, combinations thereof, and so on. The storage processing circuitry 40 is constructed and arranged to provide a variety of data storage system services. For example, the storage processing circuitry 40 responds to the I/O requests 30 from the host computers 22 by robustly and reliably storing the host data 32 into and retrieving the host data 32 from the array of storage devices 44. Other suitable data storage system services include snapshotting, backups, archiving, replication, compression, deduplication, defragmentation, and so on.

The communications medium 26 is constructed and arranged to connect the various components of the data storage environment 20 together to enable these components to communicate via exchanging electronic signals 50 (e.g., see the double arrow 50). At least a portion of the communications medium 26 is illustrated as a cloud to indicate that the communications medium 26 is capable of having a variety of different topologies including backbone, hub-and-spoke, fabric, loop, irregular, combinations thereof, and so on. Along these lines, the communications medium 26 may include copper-based data communications devices and cabling, fiber optic communications devices and cabling, wireless communication devices, combinations thereof, etc. Furthermore, the communications medium 26 is capable of supporting SAN-based communications, LAN-based communications, cellular communications, WAN-based communications, distributed infrastructure communications, other topologies, combinations thereof, etc.

During operation, the storage processing circuitry 40 of the data storage equipment 24 stores host data 32 into the array of storage devices 44 and loads host data 32 from the array of storage devices 44 in response to the I/O requests 30. While doing so, the storage processing circuitry 40 places data that is read from the storage devices 44 into the read cache 42 for possible future access. Accordingly, if there is a subsequent read request for the same data, the storage processing circuitry 40 is able to provide that data from the read cache 42 rather than re-read the data from the storage devices 44, thus reducing latency.

Moreover, the storage processing circuitry 40 of the data storage equipment 26 applies aspects of deduplication to prevent multiple copies of the same data from residing in the read cache 42 (e.g., by removal, by prevention, etc.). Such operation improves efficiency of the read cache 42 since the read cache 42 is now able to hold other data to support other read requests with low latency.

In some arrangements, the storage processing circuitry 40 provides a deduplication service which attempts to eliminate duplicate copies of the same data within secondary storage formed by the array of storage devices 44. That is, the storage processing circuitry 40 attempts to store just a single instance of each data element (e.g., a data block, a slice of data, an extent, etc.) within array of storage devices 44. To this end, the storage processing circuitry 40 generates a digest of each data element (e.g., by applying a hash function to the data) and then, based on comparing the digests to an index of digests that identifies data within the read cache 42, looks for matches that may signifying multiple copies of the same data elements. If copies of the same data element are found (e.g., by finding a match, via a subsequent bit-by-bit comparison, etc.), the storage processing circuitry 40 adjusts metadata to reference a single copy of the data element and eliminate the extra copy thus saving storage space. Further details will now be provided with reference to FIG. 2.

Figure 2:
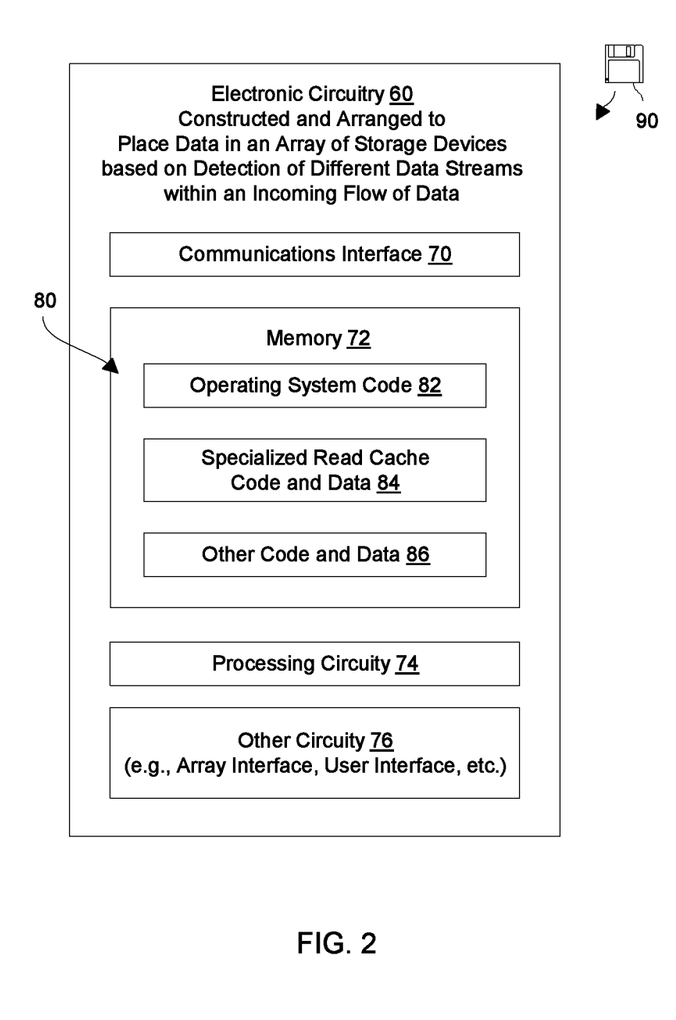
FIG. 2 is a block diagram of particular data storage circuitry of the data storage environment of FIG. 1.

FIG. 2 shows particular details of electronic circuitry 60 which forms the storage processing circuitry 40 of the data storage equipment 24 (also see FIG. 1) that maintains a single copy of a data element within a read cache in accordance with certain embodiments. As shown, the electronic circuitry 60 includes a communications interface 70, memory 72, and processing circuitry 74, and other circuitry 76.

The communications interface 70 is constructed and arranged to connect the data storage equipment 24 to the communications medium 26 (also see FIG. 1) to enable electronic communications with other devices of the data storage environment 20 (e.g., the host computers 22). Such communications may be SAN-based, IP-based, cellular-based, cable-based, fiber-optic based, wireless, cloud-based, combinations thereof, and so on. Accordingly, the communications interface 70 enables the data storage equipment 24 to robustly and reliably communicate with other apparatus.

The memory 72 is intended to represent both volatile storage (e.g., DRAM, SRAM, etc.) and non-volatile storage (e.g., flash memory, magnetic memory, etc.). In some arrangements, the memory 72 may utilize a portion of the array of storage devices 44 (FIG. 1). The memory 72 stores a variety of software constructs 80 including operating system code 82, specialized read cache code and data 84, as well as other code and data 86.

The operating system code 82 refers to an operating system which is involved in controlling various electronic resources of the data storage equipment 24. Along these lines, the operating system manages/allocates various electronic resources such as processor cycles, memory space, access control and privileges, application installations, and so on.

The specialized read cache code and data 84 refers to the instructions that are involved in managing operation of the read cache 42 (FIG. 1). The specialized read cache code and data 84 may include operating parameters, drivers, mapping tables, other metadata, etc. In some arrangements, the specialized read cache code and data 84 is tightly integrated with the operating system code 82 (e.g., a kernel).

Additionally, the specialized read cache code and data 84 refers to specialized instructions that provides other services such as a deduplication service which is constructed and operative to deduplicate data in the read cache 42 and perhaps other parts of the data storage equipment 24 (e.g., the array of storage devices 44). In some arrangements, the specialized read cache code and data 84 further includes specialized hashing algorithms that generate digests to uniquely identify data, an index of digests, and data structures that implement deduplication.

The other code and data 86 refers to various other instructions, parameters, data, etc. For example, the data storage equipment 24 may be equipped with other tools and utilities, user-level applications, code for other services (e.g., snapshotting, backups, archiving, data recovery, RAID, compression, replication, etc.), and so on.

The processing circuitry 74 is constructed and arranged to operate in accordance with the various software constructs 80 stored in the memory 72. As will be explained in further detail shortly, the processing circuitry 74 executes code of the various software constructs 80 to form specialized circuitry that concurrently carries out data storage operations while maintaining single copies of data within the read cache 42 (also see FIG. 1).

Such processing circuitry 74 may be implemented in a variety of ways including via one or more processors (or cores) running specialized software, application specific ICs (ASICs), field programmable gate arrays (FPGAs) and associated programs, discrete components, analog circuits, other hardware circuitry, combinations thereof, and so on. In the context of one or more processors executing software, a computer program product 90 is capable of delivering all or portions of the software constructs 80 to the electronic circuitry 60. In particular, the computer program product 90 has a non-transitory (or non-volatile) computer readable medium which stores a set of instructions which controls one or more operations of the electronic circuitry 60. Examples of suitable computer readable storage media include tangible articles of manufacture and apparatus which store instructions in a non-volatile manner such as CD-ROM, DVD, flash memory, disk memory, tape memory, and the like.

The other circuitry 76 represents additional hardware. For example, the other circuitry 76 (or perhaps the communications interface 70) includes circuitry that operates as a storage drive (or array) interface to communicate with the storage drives 44 (e.g., SATA, SAS, PCIe, etc.). As another example, the other circuitry 76 may include a user terminal or service processor that enables a human user to control and/or configure the data storage equipment 24, and so on. Further details will now be provided with reference to FIGS. 3 through 5.

Figure 3:
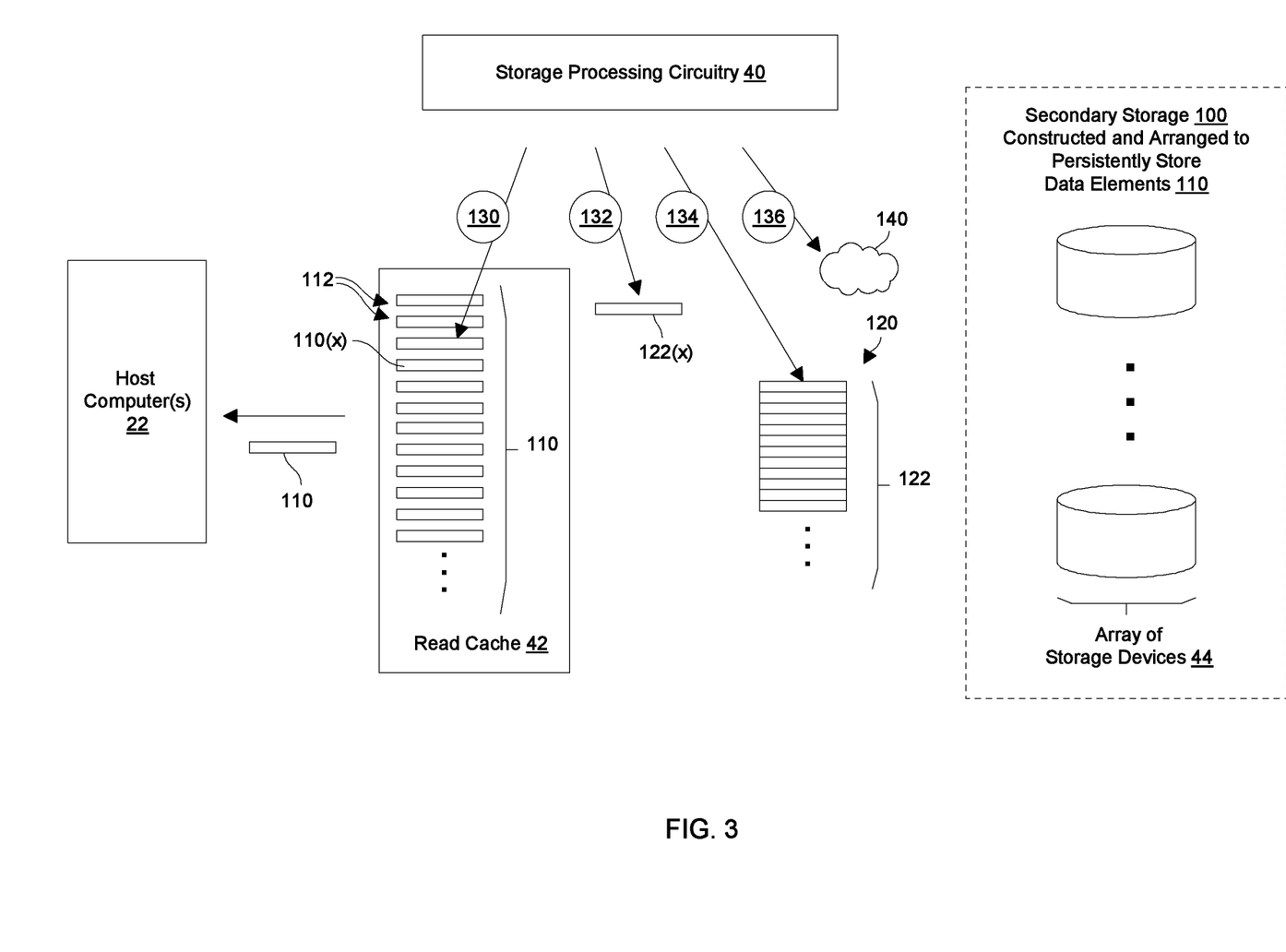
FIG. 3 is a block diagram illustrating particular details of read cache operation in accordance with a first example embodiment.
Figure 4:
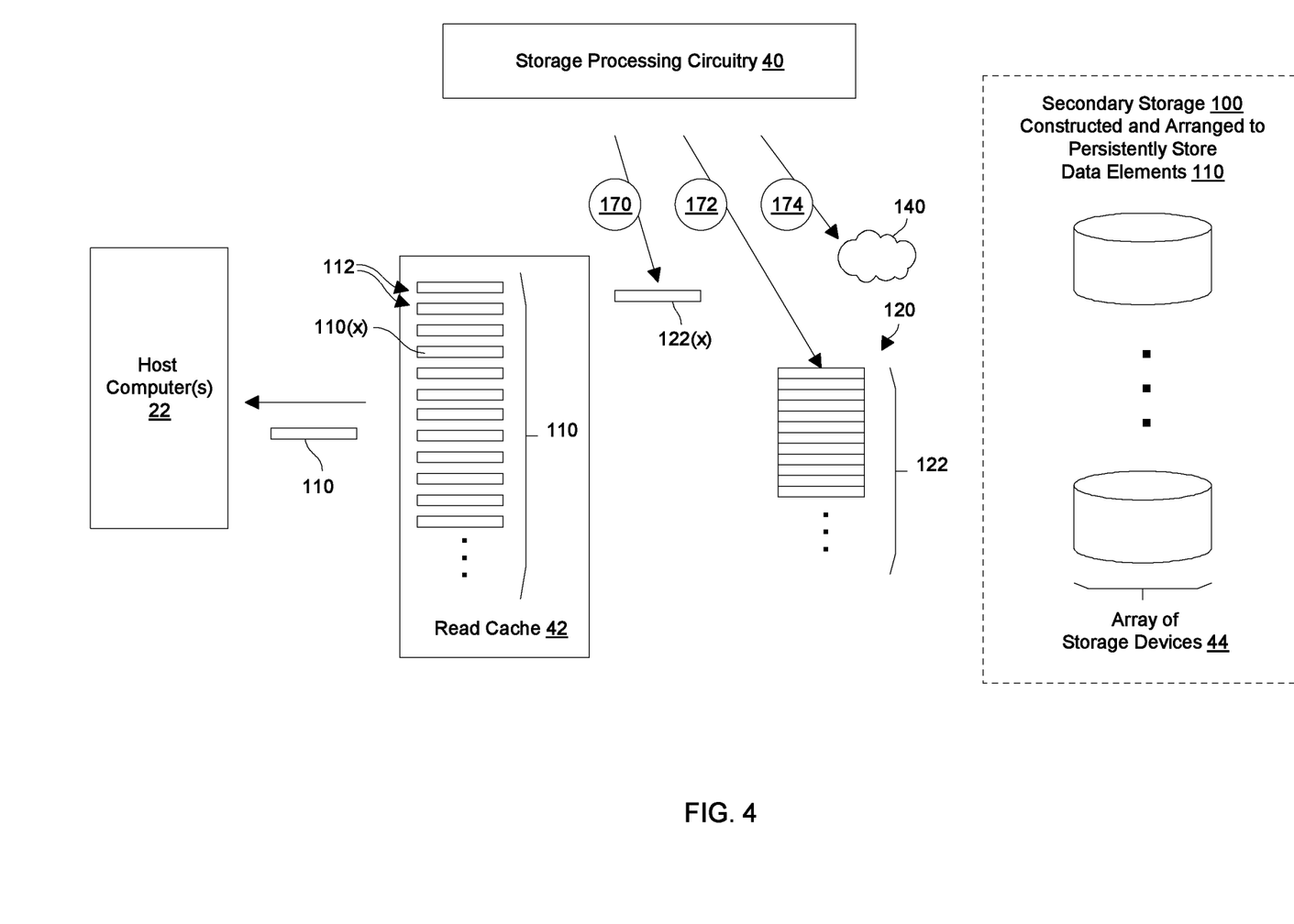
FIG. 4 is a block diagram illustrating particular details of read cache operation in accordance with a second example embodiment.
Figure 5:
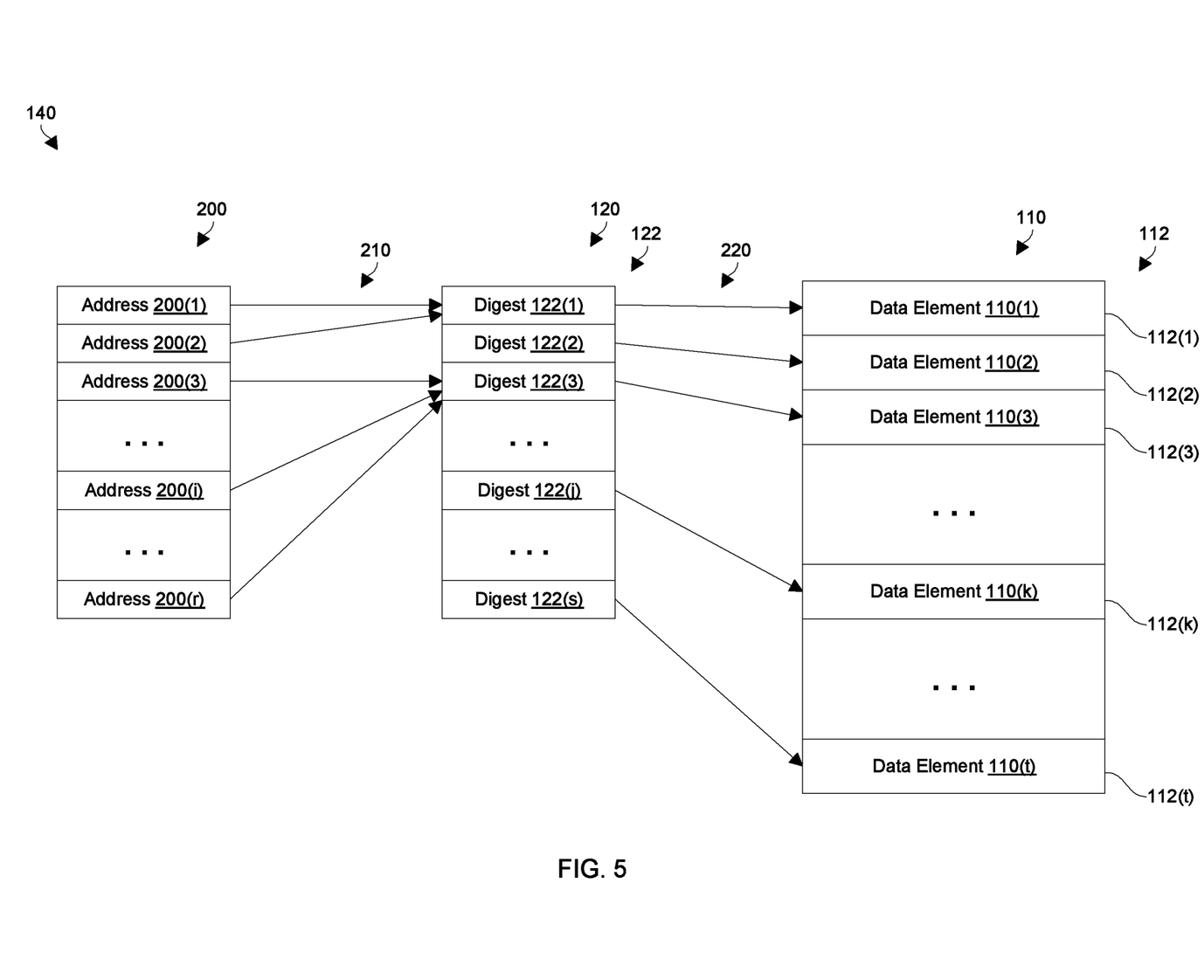
FIG. 5 is a block diagram illustrating particular details of how metadata is adjusted to access data elements within the read cache.

FIGS. 3 through 5 show particular operational details of the storage processing circuitry 40 when maintaining single copies of data within the read cache 42 (also see FIG. 1). FIG. 3 shows operation of the storage processing circuitry 40 to remove unnecessary copies of data from the read cache 42 in a background deduplication manner in accordance with a first example embodiment. FIG. 4 shows operation of the storage processing circuitry 40 to prevent unnecessary copies of data from reaching the read cache 42 in an inline deduplication manner in accordance with a second example embodiment. FIG. 5 shows particular details of how the storage processing circuitry 40 adjusts metadata to access deduplicated data within the read cache 42.

As shown in both FIGS. 3 and 4, the array of storage devices 44 provides secondary storage 100 that stores data elements 110 (e.g., blocks, slices, extents, etc.) in a non-volatile manner. Along these lines, the data elements 110 may be protected via various forms of fault tolerance (e.g., mirroring, RAID Level 5, RAID Level 6, RAID Level 10, and so on). Such data elements 110 may contain host data, non-host data, metadata, configuration data, code for applications, combinations thereof, etc.

Additionally, the storage processing circuitry 40 moves data elements 110 into locations 112 of the read cache 42 (e.g., cache lines) when processing read requests and manages an index (or database) 120 of digests 122 which uniquely identify the data elements 110 currently residing within the locations 112 of the read cache 42. In some arrangements, the storage processing circuitry 40 generates such digests 122 algorithmically such as via the application of a hash function such as SHA-1, SHA-2, SHA-3, and so on. Other digest mechanisms are suitable for use as well (e.g., mapping pairs, lookup tables using unique identifiers, etc.). If two digests 122 match, the storage processing circuitry 40 may consider the data elements 110 identified by the two digests 122 to be the same.

As shown in FIG. 3 and in accordance with some embodiments, the storage processing circuitry 40 operates to maintain single copies of data elements 110 within the read cache 42 using certain aspects of background deduplication. Here, as shown by the arrow 130, the storage processing circuitry 40 places data elements 110 within the read cache locations 112 when the storage processing circuitry 40 reads the data elements 110 from the secondary storage 100 to satisfy read requests (also see the I/O requests 30 in FIG. 1).

While the storage processing circuitry 40 continues to satisfy read requests, the storage processing circuitry 40 removes extra copies of data elements 110 from the read cache locations 112 and updates appropriate metadata. Such operation may be performed in the background and at a lower priority so as not to interfere with servicing of read requests. Along these lines, for a new data element 110(x) that the storage processing circuitry 40 places in the read cache 42, the storage processing circuitry 40 obtains a digest 122(x) that identifies that data element 110(x) (arrow 132).

In some arrangements, the storage processing circuitry 40 generates the digest 122(x) from the data element 110(x) dynamically when reading the data element 110(x) from the secondary storage 100 and placing the data element 110(x) in the read cache 42. In other arrangements, the storage processing circuitry 40 generates the digest 122(x) earlier such as when initially storing the data element 110(x) in the secondary storage 100 (e.g., the digest 122(x) is simply retrieved when the data element 110(x) is read from the secondary storage 110). In yet other arrangements, the storage processing circuitry 40 generates the digest 122(x) while the data element 110(x) is at rest within the read cache 42.

Next, the storage processing circuitry 40 accesses the index 120 to determine whether the digest 122(x) resides within the index 120 (arrow 134). If the storage processing circuitry 40 detects a matching digest 122(x) within the index 120, the result of this search indicates that the same data element 110(x) resides within multiple locations 112 of the read cache 42. Accordingly, one of the copies of the data element 110(x) can be deduplicated.

In some arrangements, the storage processing circuitry 40 may perform an optional bit-by-bit comparison of data elements 110 within the read cache 42 in response to finding matching digests 122. Such operation confirms that the data elements 112 are actual copies.

Then, the storage processing circuitry 40 performs a deduplication operation (arrow 136) that removes the unnecessary copy of the data element 110(x) from the read cache 42 thus freeing up read cache space and updates appropriate read cache metadata 140. As a result, any subsequent read request to access the data element 110(x) (e.g., regardless of which earlier source provides the subsequent read request) will result in delivery of the data element 110(x) from the read cache 42 rather than re-reading the data element 110(x) from the secondary storage 100. Accordingly, read latency is significantly shorter and the read cache 42 has more space to hold other data elements 110.

As shown in FIG. 4, in accordance with some embodiments, the storage processing circuitry 40 operates to maintain single copies of data elements 110 within the read cache 42 using certain aspects of inline deduplication. In particular, in response to a read request for a data element 110(x) (also see the I/O requests 30 in FIG. 1), the storage processing circuitry 40 obtains a digest 122(x) that uniquely identifies the data element 110(x) (arrow 170).

In this embodiment, the storage processing circuitry 40 may dynamically generate the digest 122(x) from the data element 110(x) when reading the data element 110(x) from the secondary storage 110 in response to the read request. Alternatively, the storage processing circuitry 40 may generate the digest 122(x) when initially storing the data element 110(x) in the secondary storage 110 and thus simply retrieve the previously generated digest 122(x) in response to receipt of the read request.

Next, the storage processing circuitry 40 accesses the index 120 to determine whether the digest 122(x) resides within the index 120 (arrow 172). If the storage processing circuitry 40 detects a matching digest 122(x) within the index 120, the match indicates that another copy of the data element 110(x) already resides in a location 112 of the read cache 42 and one of the copies of the data element 110(x) can be deduplicated. It should be understood that, in this embodiment, the digests 122 may be strong enough that they can be relied upon to uniquely identify the data elements 110 and so that a bit-by-bit comparison is unnecessary.

Then, the storage processing circuitry 40 performs a deduplication operation (arrow 174) that updates appropriate read cache metadata 140. Accordingly, the read cache 42 is prevented from unnecessarily storing multiple copies of the same data element 110(x) and any subsequent read request to access the data element 110(x) (e.g., regardless of which earlier source provides the subsequent read request) will result in delivery of the data element 110(x) from the read cache 42 rather than re-reading the data element 110(x) from the secondary storage 100. Thus, read latency is significantly shorter and the read cache 42 has more space to hold other data elements 110.

FIG. 5 shows example metadata 140 that identifies data elements 110 residing within locations 112 of the read cache 110. As shown, the metadata 140 includes address pointers 200, digest pointers 210, the index 120 of digests 122, and read cache pointers 220. Such metadata 140 may include other information and may take the form of tables, arrays, linked lists, more complicated data structures, combinations thereof, and so on.

Initially, the address pointers 200 reference data elements 110 within the secondary storage 100 provided by the array of storage devices 44 (also see FIGS. 1 and 3-4). However, when the storage processing circuitry 40 processes a read request and copies a data element 110 from the secondary storage 100 into a location 112 of the read cache 42 in response to the read request, the storage processing circuitry 40 updates the address pointer 200 to that data element 110 to point to the digest 122 that identifies the read cache location 112 holding that data element 110.

For example, in response to a particular read request, suppose that the storage processing circuitry 40 updates the metadata 140 so that the address 200(1) is paired with a digest pointer 210 that points to digest 122(1) and similarly digest 122(1) is paired with a read cache pointer 220 to identify a read cache location 112(1) that holds the data element 110(1). Accordingly, any subsequent read request that includes the address 200(1) is able to access the data element 110(1) from the read cache location 112(1) rather that require re-reading of the data element 110(1) from the secondary storage 100.

During deduplication processing, the storage processing circuitry 40 adjusts the address pointers 200 to point to a common digest 122 when multiple copies of the same data element 110 are found within the read cache 42. For example, initially in response to a read request, address 200(2) may have been paired with a digest pointer 210 that points to the digest 122(2) and similarly the digest 122(2) is paired with a read cache pointer 220 to identify a read cache location 112(2) that holds the data element 110(2). Now, as shown by the read cache pointers 220, the digest 122(1) identifies a read cache location 112(1) which holds the data element 110(1), and the digest 122(2) identifies another read cache location 112(2) which holds the data element 110(2).

However, suppose that the storage processing circuitry 40 determines that the digest 122(1) and the digest 122(2) are the same. Such a determination means that the storage processing circuitry 40 may perform deduplication so that only one copy of the data element 110 resides in the read cache 42. In this situation, the storage processing circuitry 40 modifies the address pointer 210 for the address 200(2) to identify the digest 122(1). Now, the address 200(1) and the address 200(2) identify the same read cache location 112(1) and thus the data element 110(1) in the read cache 42.

Accordingly, any subsequent read request that includes the address 200(1) or address 200(2) is able to access the data element 110(1) from the read cache location 112(1) rather that require re-reading data from the secondary storage 100. Moreover, the storage processing circuitry 40 is able to remove the data element 110(2) from the read cache location 112(2) thus freeing up the read cache location 112(2) for reuse.

It should be understood that more than two addresses 200 may refer to the same data element 110 residing in the read cache 42. For example, as shown in FIG. 5, each of the addresses 200(3), 200(i), and 200(r) refers to the digest 122(3) which is paired with a read cache pointer 220 that points to a read cache location 112(3) that holds the data element 110(3).

Accordingly, to access the data within the read cache 42, the circuitry can operate in a standard manner using standard addressing techniques, or via the addressing structures of the metadata 140 via aspects of deduplication. One should further appreciate that such operation essentially makes the data within the read cache 42 content addressable since the digests 122 may be derived algorithmically using the data itself as input. Further details will now be provided with reference to FIG. 6.

Figure 6:
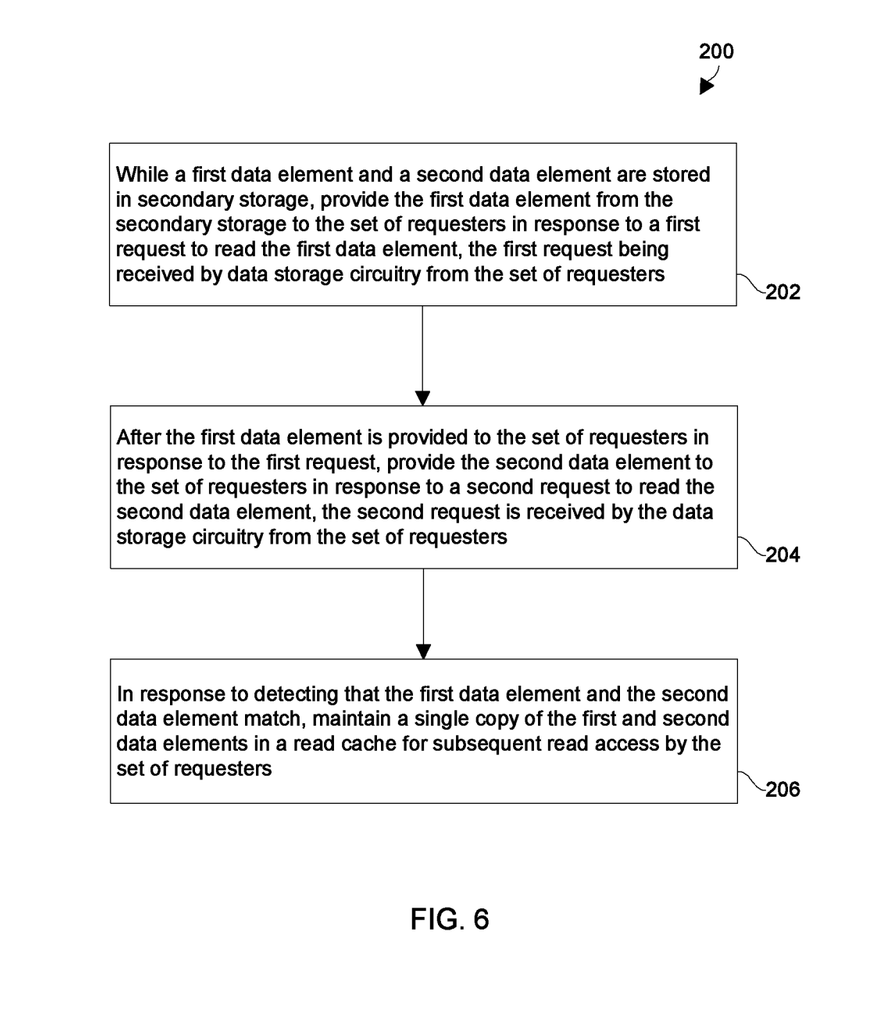
FIG. 6 is a flowchart of a procedure which is performed by the data storage circuitry of FIG. 2.

FIG. 6 is a flowchart of a procedure 200 which is performed by data storage circuitry when processing read requests from a set of requesters. Suitable data storage circuitry includes the store processing circuitry 40 (FIG. 1), the electronic circuitry 60 (FIG. 2), and the like. Additionally, suitable requesters include host computers 22, internal or external data storage services, and the like (also see FIG. 1).

At 202, while a first data element and a second data element are stored in secondary storage, the data storage circuitry provides the first data element from the secondary storage to the set of requesters in response to a first request to read the first data element. The first request is received by the data storage circuitry from the set of requesters. As part of this process, the data storage circuitry may place first data element in a read cache.

At 204, after the first data element is provided to the set of requesters in response to the first request, the data storage circuitry provides the second data element to the set of requesters in response to a second request to read the second data element. The second request is received by the data storage circuitry from the set of requesters.

At 206, in response to detecting that the first data element and the second data element match, the data storage circuitry maintains a single copy of the first and second data elements in a read cache for subsequent read access by the set of requesters. In some arrangements, the data storage circuitry performs background deduplication to remove one of the copies from the read cache (also see FIG. 3). In other arrangements, the data storage circuitry performs inline deduplication to prevent the read cache from storing multiple copies of the same data element altogether (also see FIG. 4).

As described above, improved techniques are directed to maintaining a single copy of data within a read cache 42. To this end, aspects of deduplication may be employed. In some arrangements, deduplication is performed on data within the read cache 42 to detect and remove copies of the same data. In other arrangements, potential matches are detected while retrieving data from secondary storage 100 into the read cache 42 so that placing multiple copies of the same data within the read cache 42 can be avoided altogether. Such operation makes more efficient use of the read cache 42, e.g., more data can now be stored within the read cache 42, unnecessary displacement of data is avoided, and so on.

One should appreciate that the above-described techniques do not merely store data, move data around, or simply deduplicate. Rather, the disclosed techniques involve improving data storage technology. For example, read cache storage efficiency is improved. As a result, there is less data displaced from the read cache thus reducing latency on reading that data (e.g., reads are serviced from the read cache rather than from secondary storage), and so on.

While various embodiments of the present disclosure have been particularly shown and described, it will be understood by those skilled in the art that various changes in form and details may be made therein without departing from the spirit and scope of the present disclosure as defined by the appended claims.

For example, it should be understood that various components of the data storage environment 20 such as the host computers 22 are capable of being implemented in or "moved to" the cloud, i.e., to remote computer resources distributed over a network. Here, the various computer resources may be distributed tightly (e.g., a server farm in a single facility) or over relatively large distances (e.g., over a campus, in different cities, coast to coast, etc.). In these situations, the network connecting the resources is capable of having a variety of different topologies including backbone, hub-and-spoke, loop, irregular, combinations thereof, and so on. Additionally, the network may include copper-based data communications devices and cabling, fiber optic devices and cabling, wireless devices, combinations thereof, etc. Furthermore, the network is capable of supporting LAN-based communications, SAN-based communications, combinations thereof, and so on.

The individual features of the various embodiments, examples, and implementations disclosed within this document can be combined in any desired manner that makes technological sense. Furthermore, the individual features are hereby combined in this manner to form all possible combinations, permutations and variants except to the extent that such combinations, permutations and/or variants have been explicitly excluded or are impractical. Support for such combinations, permutations and variants is considered to exist within this document.

Along these lines, in some arrangements, the aspects of deduplication that are employed to manage data within the read cache 42 can be shared with other deduplication services. For example, the data storage equipment 24 may perform inline deduplication of new data provided by the host computers 22. Additionally, the data storage equipment 24 may perform background deduplication on data residing in secondary storage 100. Moreover, the digests that are used during such inline and/or background deduplication can be reused when applying the aspects of deduplication to the read cache. Such modifications and enhancements are intended to belong to various embodiments of the disclosure.

What is claimed is:

1. In data storage circuitry, a method of processing read requests from a set of requesters, the method comprising:
while a first data element and a second data element are stored in secondary storage, providing the first data element from the secondary storage to the set of requesters in response to a first request to read the first data element, the first request being received by the data storage circuitry from the set of requesters;

after the first data element is provided to the set of requesters in response to the first request, providing the second data element to the set of requesters in response to a second request to read the second data element, the second request being received by the data storage circuitry from the set of requesters; and in response to detecting that the first data element and the second data element match, maintaining a single copy of the first and second data elements in a read cache for subsequent read access by the set of requesters.

2. A method as in claim 1 wherein providing the first data element to the set of requesters in response to the first request includes placing a copy of the first data element in the read cache;

wherein providing the second data element to the set of requesters in response to the second request includes placing a copy of the second data element in the read cache; and wherein maintaining the single copy of the first and second data elements in the read cache for subsequent read access includes performing a deduplication operation that deduplicates the copy of the first data element and the copy of the second data element into the single copy of the first and second data elements.

3. A method as in claim 2 wherein the read cache includes a deduplication index of digest entries, each digest entry including a digest that identifies a particular data element in the read cache; and wherein performing the deduplication operation includes:
based on accessing the deduplication index of the read cache, detecting a match between (i) a first digest of a first digest entry of the deduplication index that identifies the first data element and (ii) a second digest of a second digest entry of the deduplication index that identifies the second data element.

4. A method as in claim 3 wherein performing the deduplication operation further includes:

in response to detecting the match between the first digest and the second digest, performing a bit-by-bit comparison operation that compares each bit of the first data element with a corresponding bit of the second data element to determine whether the first data element and the second data element match each other.

5. A method as in claim 4 wherein performing the deduplication operation further includes:

deleting one of the first data element and the second data element from the read cache in response to a result of the bit-by-bit comparison operation indicating that the first data element and the second data element match each other.

6. A method as in claim 3 wherein performing the deduplication operation further includes:

in response to detecting the match between the first digest and the second digest, deleting one of the first data element and the second data element from the read cache.

7. A method as in claim 6 wherein providing the first data element to the set of requesters in response to the first request further includes providing a first pointer that leads to (i) the first digest entry of the deduplication index and (ii) the copy of the first data element placed in the read cache;

wherein providing the second data element to the set of requesters in response to the second request further includes providing a second pointer that leads to (i) the second digest entry of the deduplication index and (ii) the copy of the second data element placed in the read cache; and wherein performing the deduplication operation further includes:
in response to detecting the match between the first digest and the second digest, replacing the second pointer with the first pointer and nullifying the second digest entry of the deduplication index.

8. A method as in claim 6, further comprising:
after the deduplication operation is performed, providing the first data element from the read cache to the set of requesters in response to another request to read the second data element from the set of requesters.

9. A method as in claim 8, further comprising:
after the deduplication operation is performed, providing the first data element from the read cache to the set of requesters in response to another request to read the first data element from the set of requesters.

10. A method as in claim 1 wherein providing the first data element to the set of requesters in response to the first request includes placing a copy of the first data element in the read cache; and wherein providing the second data element to the set of requesters in response to the second request includes (i) detecting that the first data element and the second data element match each other and (ii) providing the first data element from the read cache to the set of requesters in response to the second request to read the second data element.

11. A method as in claim 10 wherein the data storage circuitry includes a deduplication index of digest entries, each digest entry including a digest that uniquely identifies a particular data element stored in the secondary storage; and wherein detecting that the first data element and the second data element match each other includes detecting a match between (i) a first digest of a first digest entry of the deduplication index that identifies the first data element and (ii) a second digest of a second digest entry of the deduplication index that identifies the second data element.

12. A method as in claim 11, further comprising:
in response to detecting that the first data element and the second data element match each other, updating a set of pointers that initially referenced the second data element to subsequently reference the first data element in the read cache.

13. A method as in claim 12, further comprising:
prior to receiving the first request to read the first data element, generating the first digest based on the first data element and adding the first digest to the first digest entry of the deduplication index; and prior to receiving the second request to read the second data element, generating the second digest based on the second data element and adding the second digest to the second digest entry of the deduplication index.

14. A method as in claim 1 wherein the set of requesters includes a host computer which is external to the data storage circuitry; and wherein the method further comprises:
while providing the first data element, providing the second data element, and maintaining the single copy of the first and second data elements in the read cache, contemporaneously performing additional input/output (I/O) operations that store data elements within the secondary storage and load data elements from the secondary storage on behalf of the host computer.

15. A method as in claim 14 wherein contemporaneously performing the additional I/O operations includes:
prior to providing the first data element from the secondary storage to the set of requesters in response to the first request to read the first data element, placing a third data element in the read cache, the first data element overwriting the third data element in the read cache when the first data element is provided from the secondary storage to the set of requesters.

16. A method as in claim 15, further comprising:
after the third data element is overwritten in the read cache by the first data element, overwriting the first data element in the read cache with a fourth data element in response to another read request from the set of requesters.

17. Data storage equipment, comprising:
a read cache;
a storage device interface that interfaces with a set of storage devices that provides secondary storage; and
control circuitry coupled with the read cache and the storage device interface, the control circuitry being operative to:
while a first data element and a second data element are stored in the secondary storage, provide the first data element from the secondary storage to a set of requesters in response to a first request to read the first data element, the first request being received by the control circuitry from the set of requesters;
after the first data element is provided to the set of requesters in response to the first request, providing the second data element to the set of requesters in response to a second request to read the second data element, the second request being received by the control circuitry from the set of requesters; and
in response to detecting that the first data element and the second data element match, maintaining a single copy of the first and second data elements in the read cache for subsequent read access by the set of requesters.

18. A computer program product having a non-transitory computer readable medium which stores a set of instructions to process read requests from a set of requesters; the set of instructions, when carried out by computerized circuitry, causing the computerized circuitry to perform a method of:
while a first data element and a second data element are stored in secondary storage, providing the first data element from the secondary storage to the set of requesters in response to a first request to read the first data element, the first request being received by the computerized circuitry from the set of requesters;
after the first data element is provided to the set of requesters in response to the first request, providing the second data element to the set of requesters in response to a second request to read the second data element, the second request being received by the computerized circuitry from the set of requesters; and
in response to detecting that the first data element and the second data element match, maintaining a single copy of the first and second data elements in a read cache for subsequent read access by the set of requesters.

* * * * *